(12) United States Patent
Lim

(10) Patent No.: US 12,369,119 B2
(45) Date of Patent: Jul. 22, 2025

(54) UWB ON/OFF OPERATION METHOD TO MINIMIZE DEGRADATION OF RANGING PERFORMANCE AND UWB ANCHOR USING THE SAME

(71) Applicant: HYUNDAI MOBIS Co., Ltd., Seoul (KR)

(72) Inventor: Jong Chul Lim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 359 days.

(21) Appl. No.: 17/891,233

(22) Filed: Aug. 19, 2022

(65) Prior Publication Data

US 2023/0063790 A1 Mar. 2, 2023

(30) Foreign Application Priority Data

Sep. 2, 2021 (KR) ........................ 10-2021-0117190

(51) Int. Cl.
*H04W 52/00* (2009.01)
*H04B 1/7163* (2011.01)
*H04W 4/02* (2018.01)
*H04W 52/02* (2009.01)

(52) U.S. Cl.
CPC ...... *H04W 52/0225* (2013.01); *H04B 1/7163* (2013.01); *H04W 4/023* (2013.01)

(58) Field of Classification Search
CPC . H04W 52/0225; H04W 4/023; H04B 1/7163
See application file for complete search history.

(56) References Cited

U.S. PATENT DOCUMENTS

| 10,748,361 | B1* | 8/2020 | Zhu .................. G07C 9/00309 |
| 11,847,874 | B2* | 12/2023 | Lim ........................ H04W 4/40 |
| 2020/0137676 | A1 | 4/2020 | Yoon et al. |
| 2020/0150262 | A1 | 5/2020 | Kim et al. |
| 2021/0011143 | A1 | 1/2021 | Naiki et al. |

(Continued)

FOREIGN PATENT DOCUMENTS

| CN | 112714394 A | 4/2021 |
| CN | 115708367 A | 2/2023 |
| DE | 10 2017 201 308 A1 | 8/2018 |

(Continued)

OTHER PUBLICATIONS

Extended European search report issued on Nov. 2, 2023, in counterpart European Patent Application No. 23181361.9 (8 pages).

(Continued)

*Primary Examiner* — Erika A Washington
(74) *Attorney, Agent, or Firm* — NSIP Law

(57) ABSTRACT

An ultra-wideband (UWB) anchor using an UWB ON/OFF operation method to minimize degradation of ranging performance. The UWB anchor includes: a power supply to supply power to the UWB anchor; a transceiver to transmit/receive a UWB signal to and from a UWB tag for performing ranging; and a controller to end a ranging session when a cumulative sum of ranging failures for a specific time unit reaches a maximum number of failed ranging round attempts, and to control the power supply and the transceiver to re-enter a UWB signal-reception standby (or UWB ON) mode when a condition is satisfied.

4 Claims, 13 Drawing Sheets

(56) References Cited

U.S. PATENT DOCUMENTS

2022/0070612 A1     3/2022   Henry et al.
2022/0225056 A1*   7/2022   Glover .................... H04W 4/46

FOREIGN PATENT DOCUMENTS

| EP | 4 137 838 A2 | 2/2023 |
| JP | 2017-98759 A | 6/2017 |
| KR | 10-0793634 B1 | 1/2008 |
| WO | WO 2020/091286 A1 | 5/2020 |

OTHER PUBLICATIONS

Extended European search report issued on Jan. 25, 2023, in counterpart European Patent Application No. 22191128.2 (8 pages in English).
European Office Action issued on Sep. 26, 2024, in counterpart European Patent Application No. 22 191 128.2 (6 pages).
United States Office Action Issued on Oct. 16, 2024, in counterpart U.S. Appl. No. 18/343,509 (9 Pages in English).
Chinese Office Action issued on Mar. 25, 2025 in corresponding Chinese Patent Application No. 202211068162.X (7 pages in Chinese).

* cited by examiner

UWB ON/OFF OPERATION METHOD TO MINIMIZE DEGRADATION OF RANGING PERFORMANCE AND UWB ANCHOR USING THE SAME

CROSS-REFERENCE TO RELATED APPLICATION

This application claims priority to and the benefit of Korean Patent Application No. 10-2021-0117190, filed on Sep. 2, 2021, the disclosure of which is incorporated herein by reference in its entirety.

BACKGROUND

1. Technical Field

The present disclosure relates to an ultra-wideband (UWB) ON/OFF operation method to minimize degradation of ranging performance and a UWB anchor using the same, and more particularly, to an ultra-wideband (UWB) ON/OFF operation method to reduce power consumption by allowing a UWB anchor to be in a UWB signal-reception non-standby mode when the UWB anchor consecutively fails in ranging and to minimize degradation of ranging performance by allowing the UWB anchor to re-enter a UWB signal-reception standby mode at a predetermined timing, and a UWB anchor using the same.

2. Related Art

Ultra-wideband (UWB) is a wireless communication protocol that is operated over a very wide bandwidth (i.e., over 500 MHz) at high frequencies (of 6 to 8 GHz). It is possible to perform various functions such as position identification, position tracking and remote payment by using the UWB. In particular, the UWB may be advantageous in having excellent distance estimation accuracy compared to a conventional narrowband system. Among ranging (or distance calculation) methods using the UWB, time-of-flight (ToF) is a method of calculating a physical distance between communication subjects by multiplying time a signal arrives between the communication subjects by a speed of light.

A UWB anchor serves as a responder in a ranging process of a smart key/digital key system. The UWB anchor may receive an initial signal (or pre-poll message) of a UWB tag (e.g., smartphone equipped with a fob of the smart key system or the digital key system) serving as a UWB initiator and then respond to the message to complete its operation. However, all the plurality of UWB anchors used in the smart key/digital key system may not be always operated. The UWB anchor may be unable to receive a UWB signal for various reasons, such as being far from the UWB tag due to a feature of UWB wireless communication, lack of linearity and material influence. In this case, the UWB anchor may keep a reception window open, which may result in unnecessary power consumption.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to an ultra-wideband (UWB) ON/OFF operation method to reduce power consumption and minimize degradation of UWB ranging performance by ending a ranging session based on a preset UWB ON/OFF cycle and allowing a UWB anchor to re-enter a UWB signal-reception standby mode at a predetermined timing when the UWB anchor consecutively fails in ranging, and a UWB anchor using the same.

An aspect of the present disclosure is not limited to the above-mentioned aspect. That is, other aspects that are not mentioned may be obviously understood by those skilled in the art from the following specification.

In one general aspect, an ultra-wideband (UWB) anchor using a UWB ON/OFF operation method to minimize degradation of ranging performance includes: a power supply configured to supply power to the UWB anchor; a transceiver configured to transmit/receive a UWB signal to and from a UWB tag for performing ranging; and a controller configured to end a ranging session when a cumulative sum of ranging failures for a specific time unit reaches a maximum number of failed ranging round attempts, and to control the power supply and the transceiver to re-enter a UWB signal-reception standby (or UWB ON) mode when a condition is satisfied.

The control condition of the controller for entry into the UWB ON mode may be that a UWB OFF time elapses.

In another general aspect, a smart key system using a UWB ON/OFF operation method to minimize degradation of ranging performance includes: a plurality of UWB anchors installed in a vehicle, each UWB anchor being configured to calculate a distance between itself and a UWB tag through UWB communication and to transmit the distance; and an integrated controller configured to calculate position of the UWB tag by using the distances transmitted from the plurality of UWB anchors, and to store the position of the UWB tag. Each UWB anchor is configured to end a ranging session when a cumulative sum of ranging failures for a specific time unit reaches a maximum number of failed ranging round attempts, and to re-enter a UWB signal-reception standby (or UWB ON) mode when a UWB OFF time elapses.

Each UWB anchor may include a power supply configured to supply power to the UWB anchor, a transceiver configured to transmit/receive a UWB signal to and from the UWB tag for performing ranging, a controller configured to control the power supply and the transceiver to re-enter the UWB signal-reception standby (or the UWB ON) mode when a condition is satisfied, and a vehicle network communication unit configured to transmit corresponding information to the integrated controller when the number of ranging failures reaches the maximum number of failed ranging round attempts.

In another general aspect, an ultra-wideband (UWB) ON/OFF operation method of a UWB anchor to minimize degradation of ranging performance includes: entering, by a UWB anchor, a UWB signal-reception standby (or UWB ON) mode; determining, by a controller of the UWB anchor, whether ranging fails for each ranging block; cumulatively summing, by the controller, a number of ranging failures for each ranging block when the ranging consecutively fails; maintaining the UWB anchor in a UWB signal-reception non-standby (or UWB OFF) mode for a UWB OFF time when a cumulative sum of ranging failures reaches a maximum number of failed ranging round attempts; and returning the UWB anchor to the UWB signal-reception standby (or UWB ON) mode when the UWB OFF time elapses.

In accordance with the embodiments of the present disclosure, it is possible to minimize the unnecessary power consumption by allowing the UWB anchor not to be in the UWB signal-reception standby mode anymore by setting the threshold for the case where the UWB anchor continuously fails in its ranging.

In accordance with the embodiments of the present disclosure, it is also possible to prevent the degradation of the ranging performance of the UWB anchor by allowing the UWB anchor to re-enter the UWB signal-reception standby mode (or restart the ranging) at the predetermined timing after the end of the ranging session.

Other features and aspects will be apparent from the following detailed description, the drawings, and the claims.

DETAILED DESCRIPTION

The present disclosure may be variously modified and have various embodiments, and specific embodiments will be shown in the accompanying drawings and described in detail in a detailed description. However, it is to be understood that the present disclosure is not limited to specific embodiments, and includes all modifications, equivalents and substitutions, included in the spirit and scope of the present disclosure. When it is decided that the detailed description of the known art related to the present disclosure may obscure the subject matter of the present disclosure, the detailed description thereof will be omitted.

Terms used in the specification, "first," "second" or the like may be used to describe various components, and the components are not to be limited by the terms. The terms are used only to distinguish one component from another component.

It is to be understood that when one component is referred to as being "connected to" or "coupled to" another component, it may be directly connected or coupled to another component, or may be connected or coupled to another component while having a third component interposed therebetween. On the other hand, it is to be understood that when one component is referred to as being "directly connected to" or "directly coupled to" another component, it may be connected or coupled to another component without a third component interposed therebetween. Other expressions describing a relationship between components, that is, "between," "directly between," "neighboring to," "directly neighboring to" and the like, should be similarly interpreted.

A term " . . . unit" described in the specification refers to a processing unit of at least one function or operation and may be implemented by hardware or software or a combination of hardware and software.

Terms used in this specification are used only to describe the specific embodiments rather than limiting the present disclosure. The terms of a singular form may include plural forms unless explicitly indicated otherwise. It is to be further understood that the terms such as "comprise," "include" and the like, used in this specification specify the presence of features, numerals, steps, operations, components, parts mentioned in the specification, or combinations thereof, and do not preclude the presence or addition of one or more other features, numerals, steps, operations, components, parts or combinations thereof. Hereinafter, embodiments of the present disclosure are described in detail with reference to the accompanying drawings.

Figure 1:
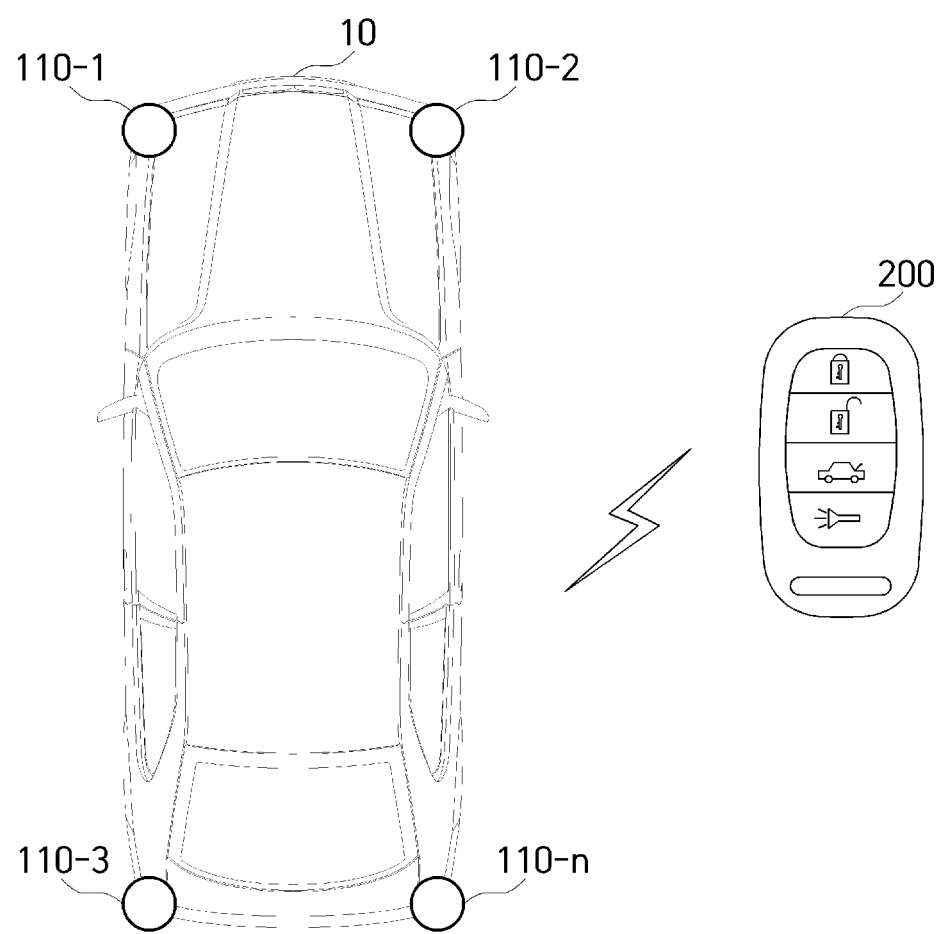
FIG. 1 is a view showing a configuration for an ultra-wideband (UWB) ranging according to an embodiment of the present disclosure.

FIG. 1 is a view showing a configuration for an ultra-wideband (UWB) ranging according to an embodiment of the present disclosure.

In an embodiment of the present disclosure, a vehicle 10 may be mounted with a plurality of UWB anchors 110, and the UWB anchor 110 may receive an initial signal transmitted from a UWB tag 200 and communicate with the UWB tag to perform ranging for the UWB tag 200. Here, the UWB tag 200 may serve as a UWB initiator, and the UWB anchor 110 may serve as a UWB responder. The UWB tag 200 may be a target of position tracking and refer to a wireless device which may perform the UWB communication. For example, the UWB tag 200 may be a smart phone equipped with a fob operated in a smart key system or a digital key system.

Figure 2:
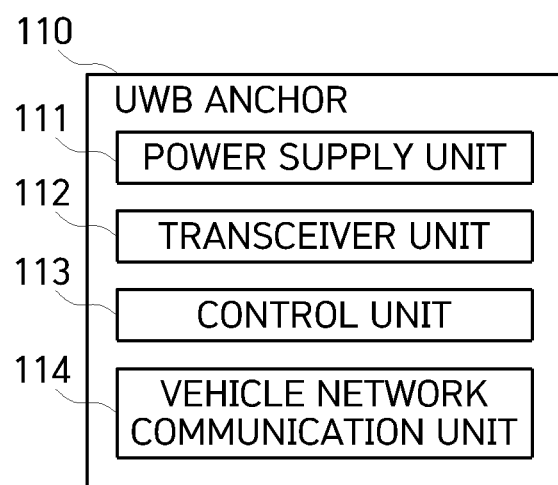
FIG. 2 is a block diagram showing a configuration of a UWB anchor according to an embodiment of the present disclosure.

FIG. 2 is a block diagram showing a configuration of the UWB anchor 110 according to an embodiment of the present disclosure.

As shown in FIG. 2, the UWB anchor 110 according to an embodiment of the present disclosure may include a power supply unit 111, a transceiver unit 112, a control unit 113, and a vehicle network communication unit 114.

The power supply unit 111 may supply power to the UWB anchor 110 under control of the control unit 113. For example, the power supply unit 111 may change a current value supplied to the UWB anchor 110 under the control of the control unit 113.

The transceiver unit 112 may receive an initial signal (or pre-poll message) from the UWB tag 200 and transmit a response signal thereto, or may receive a final signal from the UWB tag 200. In addition, the transceiver unit 112 may transmit a report signal for distance data of the UWB tag 200 to the UWB tag 200. The transceiver unit 112 may transmit and receive other signals, necessary for the UWB ranging in addition to the above signals, to and from the UWB tag 200. The transceiver unit 112 may fail to receive the signal from the UWB tag 200 within a ranging round, and thus be unable to perform the ranging. In this case, the transceiver unit 112 may transmit this failure to the control unit 113 so that the control unit 113 cumulatively sums the ranging failures for each ranging block, and performs a UWB ON/OFF operation when the ranging fails. The ranging failure refers to a case where the transceiver unit 112 fails to receive the signal from the UWB tag 200 and a distance between the UWB anchor 110 and the UWB tag 200 is unable to be calculated as a result. The ranging failure may include a case where the distance is unable to be calculated because the transceiver unit 112 fails to receive not only the initial signal from the UWB tag 200 but also its subsequent signal.

The transceiver unit 112 may close a reception window based on the UWB OFF control of the control unit 113 when the ranging fails. In addition, the transceiver unit 112 may transmit information in the final signal transmitted by the UWB tag 200 (i.e. information on the identity (ID) of the UWB tag 200 and UWB signal transmission/reception timing) and information on reception timing of the final signal to the control unit 113 to allow the control unit 113 to calculate the distance.

When receiving the ranging failure from the transceiver unit 112, the control unit 113 may cumulatively sum the ranging failures for each ranging block and check whether the cumulative sum reaches a maximum number of failed ranging round attempts MAX_RR_RETRY. When the consecutively-cumulative sum of ranging failures for each ranging block reaches the maximum number of failed ranging round attempts, the control unit 113 may apply a preset UWB OFF time. The control unit 113 may end a ranging session (i.e., start a UWB OFF mode) to reduce power consumption. That is, the control unit 113 may control the transceiver unit 112 to close the reception window and the power supply unit 111 to conduct only a predetermined current value. The control unit 113 may control the UWB OFF time based on the number or time of predetermined ranging blocks. That is, the control unit 113 may allow the ranging to be attempted again (i.e. re-entrance to a UWB signal-reception standby (or UWB ON) mode) when the set number of ranging blocks or time elapses. Meanwhile, the control unit 113 may calculate the distance between the UWB tag 200 and the UWB anchor 110 when the transceiver unit 112 normally receives the information on the signal transmission/reception with the UWB tag 200.

The vehicle network communication unit 114 may transmit and receive a signal to and from an integrated controller of the smart key system through a communication bus in the vehicle. When the consecutively-cumulative sum of ranging failures for each ranging block reaches the maximum number of failed ranging round attempts, the control unit 113 may allow the corresponding information to be transmitted to the integrated controller through the vehicle network communication unit 114.

Figure 3:
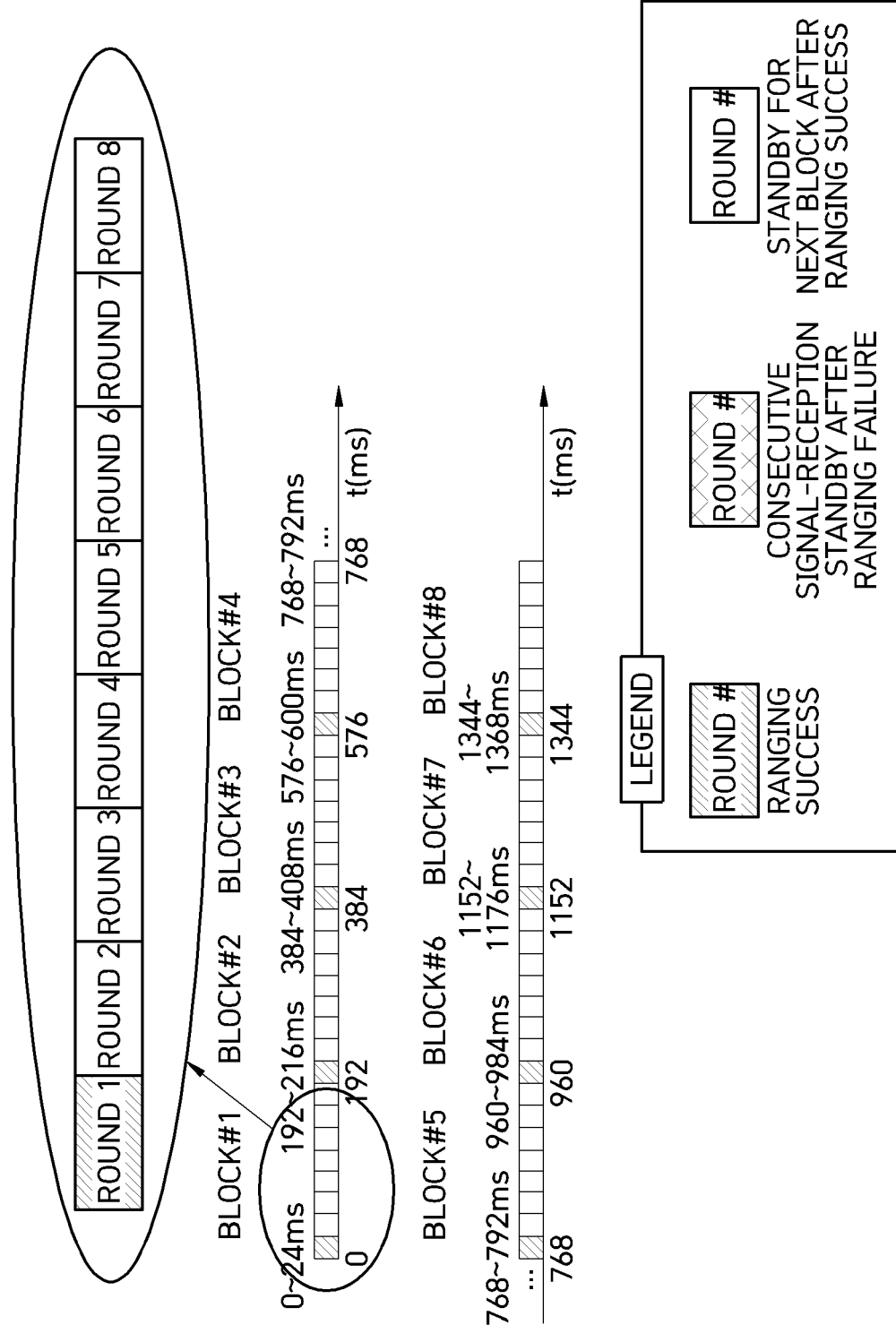
FIG. 3 is a reference view for explaining concepts of a ranging block and a ranging round.
Figure 4:
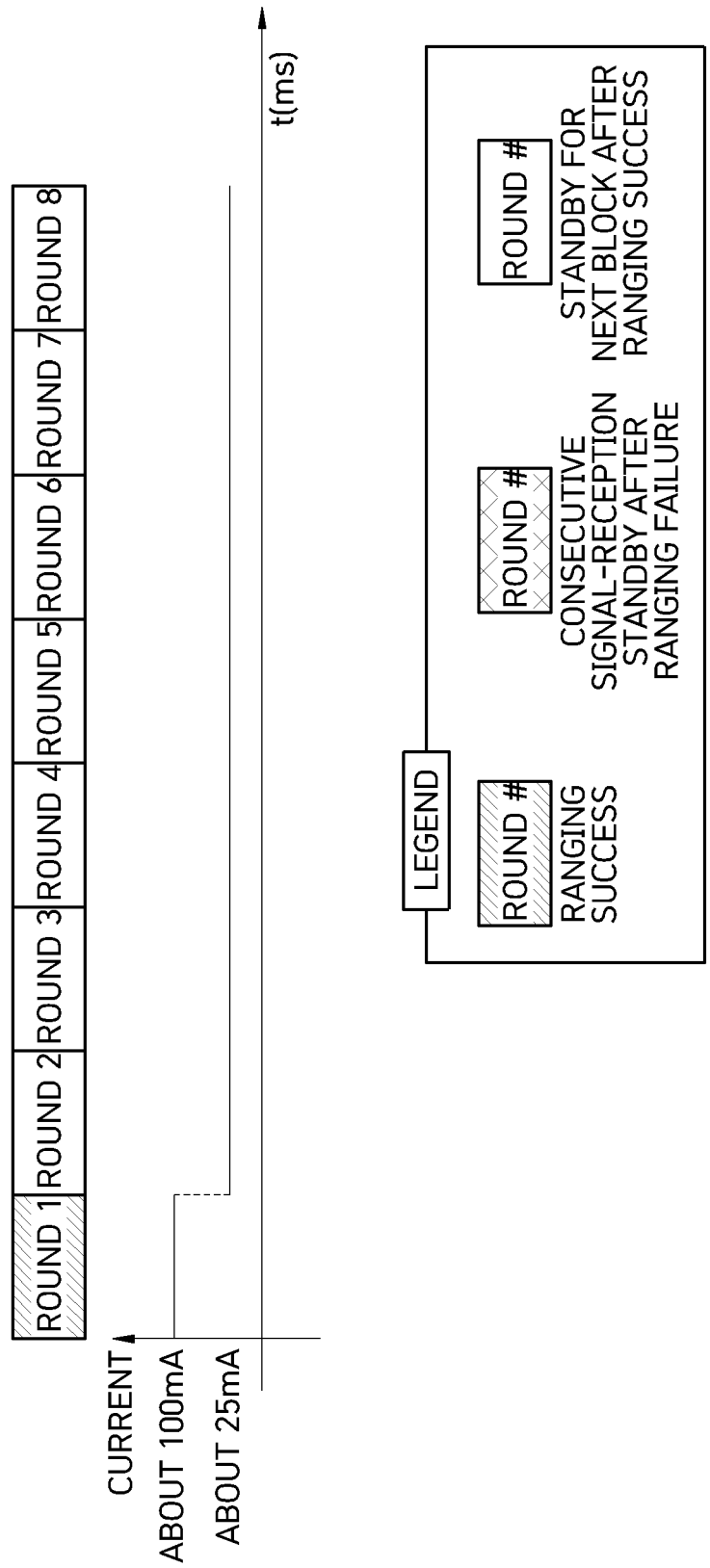
FIG. 4 is a reference view showing a change in a current value in one ranging block when the UWB ranging is successful.
Figure 5:
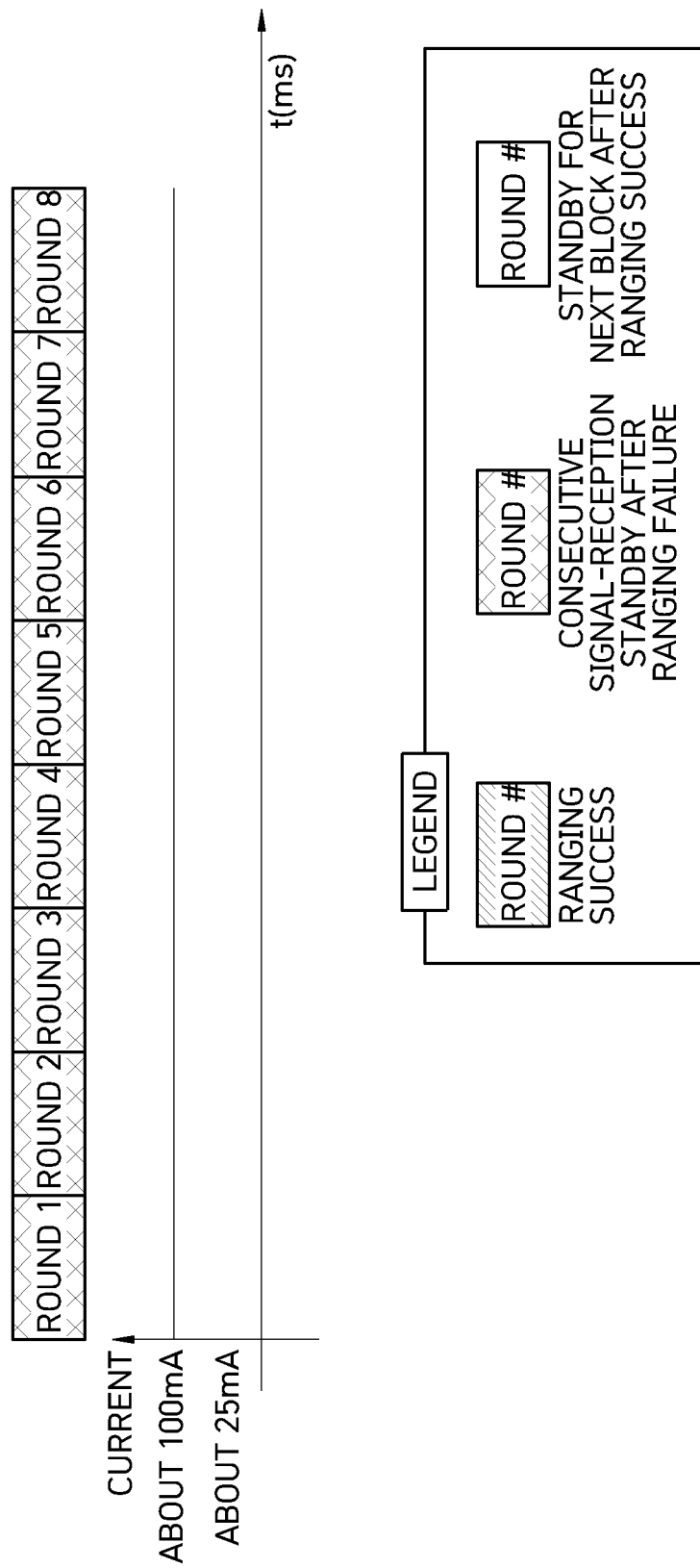
FIG. 5 is a reference view showing a change in a current value in one ranging block when the UWB ranging consecutively fails.

FIGS. 3 to 5 are reference views for comparing and explaining the power consumptions when the UWB anchor succeeds and fails in the ranging.

FIG. 3 is a reference view for explaining concepts of the ranging block and the ranging round.

The ranging block refers to a time unit for performing the ranging. The ranging block may include the plurality of ranging rounds. FIG. 3 exemplifies a case where one ranging block includes eight ranging rounds, and the number of ranging rounds included in the ranging block may be changed. FIG. 3 shows an example where the eight ranging blocks are processed along a time axis.

The ranging round refers to a unit of one complete ranging event performed between the initiator and the responder on a UWB network. FIG. 3 shows the example where one ranging block includes eight ranging rounds.

FIG. 4 is a reference view showing a change in the current value in one ranging block when the UWB ranging is successful.

Figure 6:
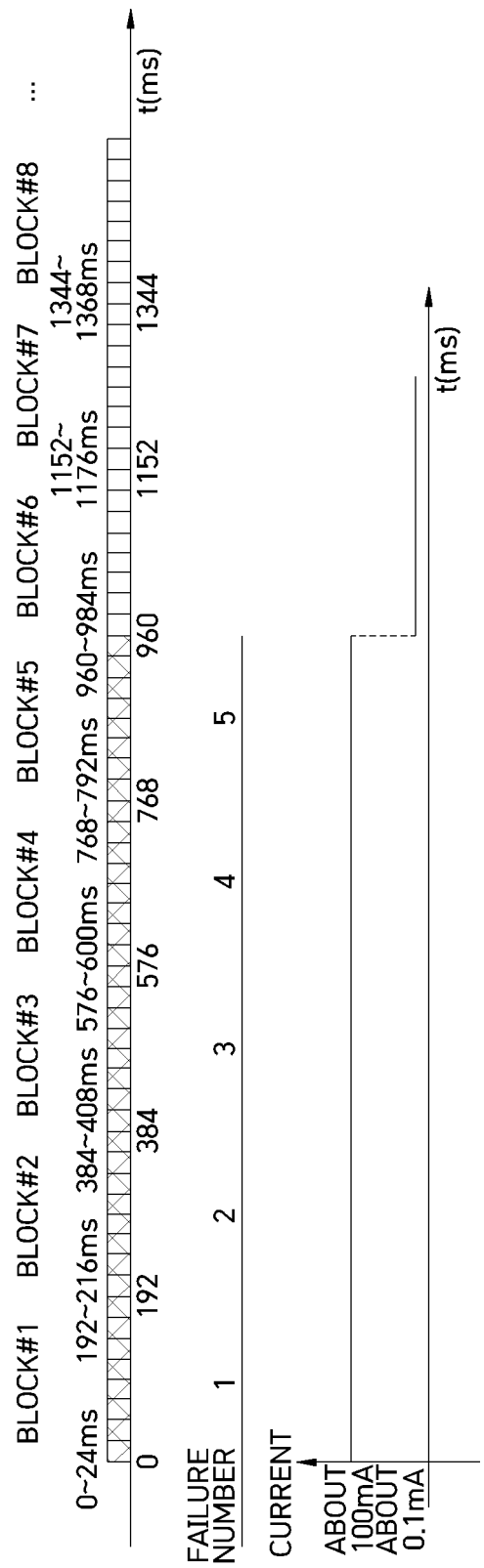
FIG. 6 is a reference view showing a change in a current value when a maximum number of failed ranging round attempts is applied.

The actual current value may depend on detailed operations of the UWB transmitter and receiver. However, for convenience of description of the concept, it may be assumed that the current value is required to be maintained at a maximum value during one ranging round on a graph of the drawing (and the current values indicated in the graphs in FIGS. 4 to 6 are approximate values).

When the ranging is successful in a first ranging round, the ranging may not be performed any more in the other ranging rounds defined as the one ranging block. Therefore, the current in the other ranging rounds may be maintained at a level (e.g., ¼) lower than the current required for the ranging.

FIG. 5 is a reference view showing a change in the current value in one ranging block when the UWB ranging consecutively fails.

Although the UWB anchor 110 consecutively fails the ranging from the first ranging round to the last ranging round, the UWB anchor 110 may be required to keep the reception window open to receive the initial signal (or pre-poll message) from the UWB tag 200. As a result, a higher current (e.g., four times higher current) in compared to the current when no ranging is performed may be required to be consecutively maintained in the corresponding ranging block, and large amount of power may thus be unnecessarily consumed compared to the case of FIG. 4.

FIG. 6 is a reference view showing a change in the current value when the maximum number of failed ranging round attempts is applied.

The maximum number of failed ranging round attempts MAX_RR_RETRY may be designated in order to respond to the aforementioned power consumption problem. The ranging session may be ended when the number of ranging failures occurring in the ranging blocks reaches a specified number of times. For example, when the maximum number of failed ranging round attempts is designated as five (5) as shown in the drawing, the ranging may be attempted in five ranging blocks, and the ranging session may then be ended. However, it is necessary to reduce the power consumption and simultaneously secure ranging performance, and it is thus required to consider timing for restarting a ranging process.

According to an embodiment of the present disclosure, one UWB anchor 110 may be in the UWB ON (or UWB signal-reception standby) mode or the UWB OFF (or idle) mode. The UWB signal-reception standby mode refers to a mode in which the UWB anchor 110 opens the reception window when the number of attempts of the UWB anchor 110 has yet to reach the predetermined maximum number of failed ranging round attempts even in a case where the UWB anchor 110 succeeds in the ranging for the UWB tag 200 or fails the ranging. The cumulative number of failures may be increased when the UWB anchor 110 consecutively fails the ranging for the UWB tag 200. The cumulative number of failures may be cumulatively summed one by one by determining whether the ranging fails for each ranging block, and may be zero (0) when the ranging is successful. When the cumulative number of failures reaches the predetermined maximum number of failed ranging round attempts, the UWB anchor 110 may be switched to the idle mode (i.e. state where the reception window is not open) to reduce the power consumption. The control unit 113 may control the power supply unit 111 and the transceiver unit 112 based on the preset UWB OFF time or the number of ranging blocks in the UWB OFF mode. During the idle mode, the transceiver unit 112 may not open the reception window under the control of the control unit 113 and the current flowing from the power supply unit 111 may be reduced compared to that flowing in the UWB ON mode. For example, a current of 100 mA may flow in the UWB signal-reception standby mode, and a current of 0.1 mA may flow in the idle mode.

Figure 7:
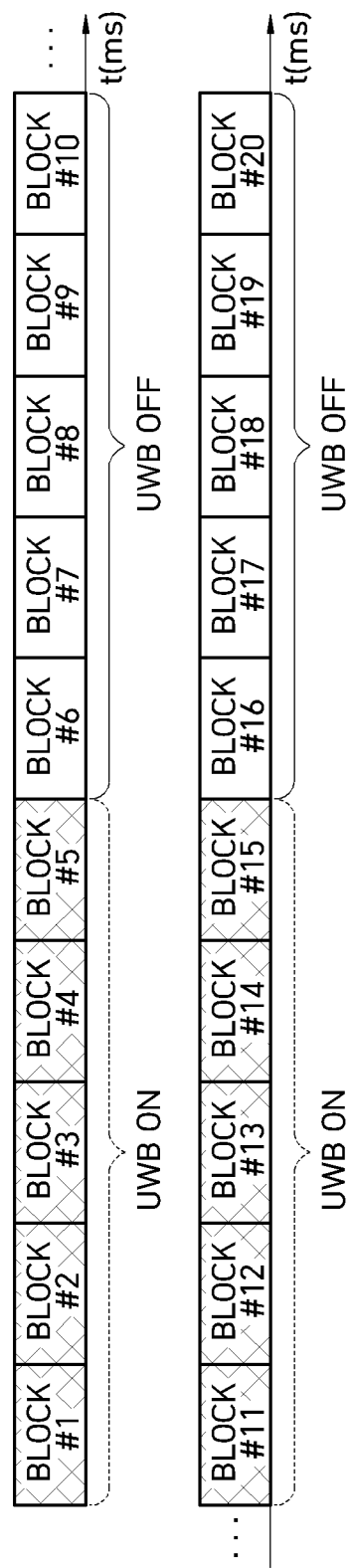
FIG. 7 is a view showing an example of UWB ON/OFF time setting of the UWB anchor according to an embodiment of the present disclosure.

The description describes an example of UWB ON/OFF time setting of the UWB anchor 110 according to an embodiment of the present disclosure with reference to FIG. 7. The time setting may repeat the UWB ON/OFF in the same period, and the UWB OFF time may be equal to time calculated by the maximum number of failed ranging round attempts MAX_RR_RETRY.

For example, when the maximum number of failed ranging round attempts is five (5) and the ranging block is 192 ms, the UWB ON time may be 960 ms by multiplying 192 ms by five (5), and the UWB OFF time may be the same 960 ms. As a result, the UWB ON/OFF may repeat every 960 ms.

This policy may reduce the power consumption of the UWB anchor by half and prevent degradation of the ranging performance by setting a UWB ranging restart (or return) timing based on the maximum number of failed ranging round attempts.

Meanwhile, it is possible to improve the ranging performance by making the UWB OFF time shorter than the UWB ON time in the UWB ON/OFF time setting of the UWB anchor 110 according to an embodiment of the present disclosure.

Figure 8A:
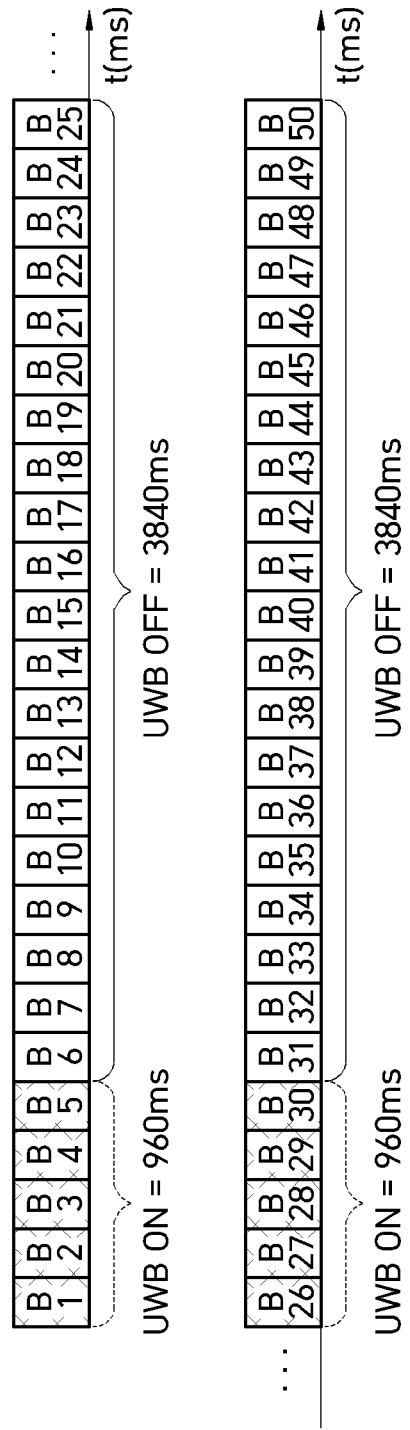
FIG. 8A is a view showing another example of the UWB ON/OFF time setting of the UWB anchor according to an embodiment of the present disclosure.

The description describes another example of the UWB ON/OFF time setting of the UWB anchor 110 according to an embodiment of the present disclosure with reference to FIG. 8A. In this time setting, the UWB OFF time may be set as a constant time regardless of the maximum number of failed ranging round attempts. For example, when the ranging block is 192 ms and the maximum number of failed ranging round attempts is five (5), the UWB ON time may be 960 ms by multiplying 192 ms by five (5), and when the UWB OFF time is set to 3840 ms, the UWB OFF time may be four times the UWB ON time.

Figure 8B:
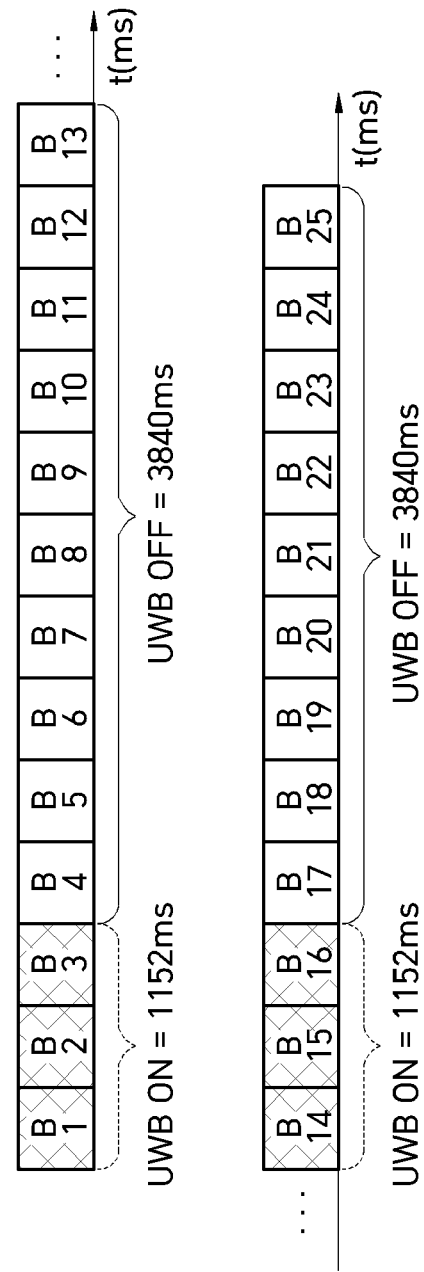
FIG. 8B is a view showing still another example of the UWB ON/OFF time setting of the UWB anchor according to an embodiment of the present disclosure.

The description describes still another example of the UWB ON/OFF time setting with reference to FIG. 8B. For example, when the ranging block is 384 ms and the maximum number of failed ranging round attempts is three (3), the UWB ON time may be 1152 ms by multiplying 384 ms by three (3), and when the UWB OFF time is 3840 ms, the UWB OFF time may be 3.33 times the UWB ON time.

The time setting above may greatly reduce the power consumption of the UWB anchor.

Yet another example of the UWB ON/OFF time setting of the UWB anchor according to an embodiment of the present disclosure is a method of increasing the UWB OFF time by a predetermined unit from an initially designated time when the corresponding UWB anchor consecutively fails the ranging during the UWB ON time. For example, when the ranging block is 192 ms and the maximum number of failed ranging round attempts is five (5), the UWB ON time may be 960 ms by multiplying 192 m by five (5). Initial UWB OFF time may be set to 3840 ms, and the increment may be set to 192 ms, which is ranging block time. The initial UWB OFF time may be four times the UWB ON time. However, the UWB OFF time may be 4.2 times (i.e. 4032 ms) the UWB ON time when the ranging fails during the next UWB ON time, and the UWB OFF time may become 4.4 times (i.e. 4224 ms) the UWB ON time when the ranging fails during the next UWB ON time. This method may greatly reduce the power consumption of the UWB anchor.

Figure 9:
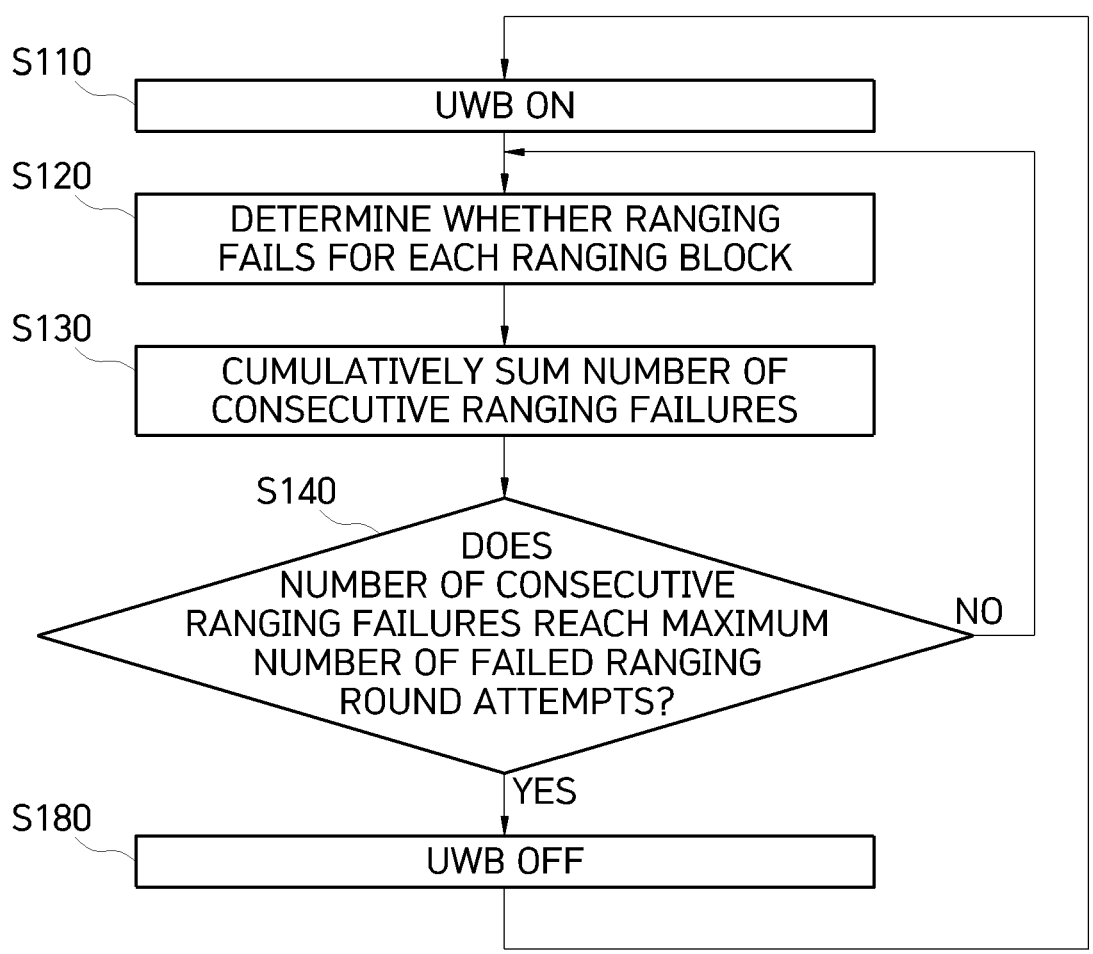
FIG. 9 is a flowchart for explaining an example of an ultra-wideband (UWB) ON/OFF operation method of a UWB anchor according to another embodiment of the present disclosure.

FIG. 9 is a flowchart for explaining an ultra-wideband (UWB) ON/OFF operation method of a UWB anchor according to another embodiment of the present disclosure.

First, in operation S110, the UWB anchor 110 may enter the UWB ON (or UWB signal-reception standby) mode, the transceiver unit 112 may open the reception window under the control of the control unit 113, and the power supply unit 111 may conduct a current sufficient to receive a UWB signal from the UWB tag 200.

In operation S120, it may be determined whether the ranging fails for each ranging block. That is, when the transceiver unit 112 fails to receive the signal from the UWB tag 200 within the ranging round and is thus unable to perform the ranging, the transceiver unit 112 may transmit this failure to the control unit 113 so that the control unit 113 cumulatively sums the ranging failures for each ranging block. When the ranging fails in all the ranging rounds in the corresponding ranging block, the control unit 113 may determine that the ranging fails in the corresponding ranging block.

In operation S130, the number of consecutive ranging failures may be cumulatively summed. For example, the number of consecutive ranging failures may be two (2) when the ranging fails in a previous ranging block and the ranging fails in a next ranging block.

In operation S140, it may be determined whether the number of consecutive ranging failures reaches the predetermined maximum number of failed ranging round attempts, the operation may return to operation S120 to determine whether the ranging consecutively fails for each ranging block when the number of consecutive ranging failures does not reach the maximum number of failed ranging round attempts, and the mode may be switched to the UWB OFF (or idle) mode when the number of consecutive ranging failures reaches the maximum number of failed ranging round attempts.

In operation S180, the reception window may not be open (i.e. the idle mode may be maintained) for the set UWB OFF time (or the number of ranging blocks). When the set UWB OFF time (or the number of ranging blocks) elapses, the control unit 113 may control the mode to return to the UWB ON (or UWB signal-reception standby) mode and the ranging to be restarted (S110).

Figure 10:
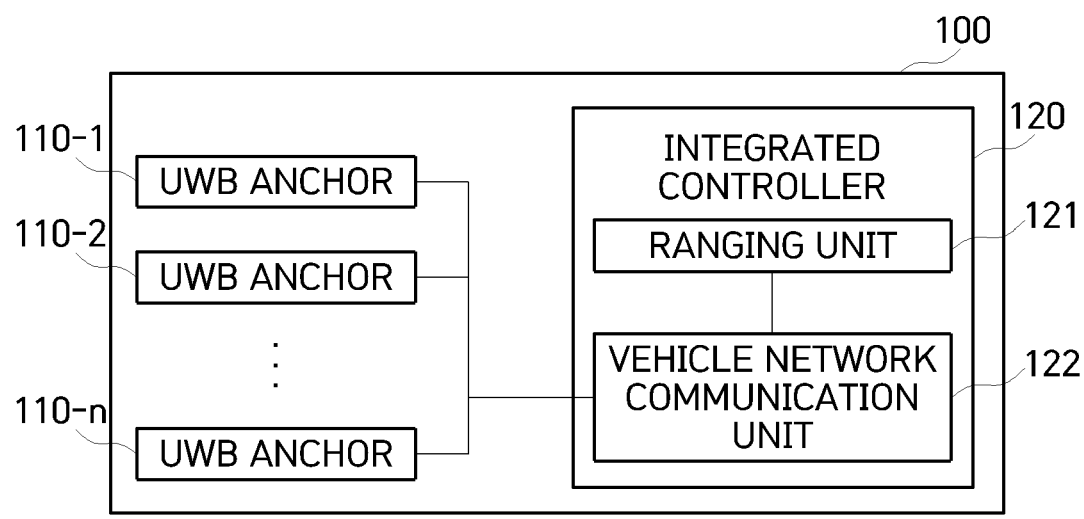
FIG. 10 is a block diagram for explaining a configuration of a smart key system according to still another embodiment of the present disclosure.

FIG. 10 is a block diagram for explaining a configuration of the smart key system according to still another embodiment of the present disclosure.

As shown in FIG. 10, a smart key system 100 according to still another embodiment of the present disclosure may include a plurality of UWB anchors 110-1 to 110-n and an integrated controller 120. The functions of the UWB anchor 110 and the components included in the UWB anchor 110 may be basically the same as those described with reference to FIG. 2.

Each UWB anchor (i.e., one of 110-1 to 110-n, hereinafter referred to as 110) may calculate the distance between itself and the UWB tag 200, and transmit the calculated distance to a vehicle network communication unit 122 of the integrated controller 120 through the built-in vehicle network communication unit 114.

The vehicle network communication unit 122 of the integrated controller 120 may transmit the calculated distance data to a ranging unit 121. The ranging unit 121 may estimate the position of the UWB tag 200 based on the distance data. A known triangulation method may be used to estimate the position of the UWB tag 200.

As described above, the control unit 113 of each UWB anchor 110 may cumulatively sum the number of ranging failures for each ranging block. When this number reaches the maximum number of failed ranging round attempts, the control unit 113 may allow this information along with the identity (ID) thereof to be transmitted to the vehicle network communication unit 122 of the integrated controller 120 through the vehicle network communication unit 114. In this case, the vehicle network communication unit 122 of the integrated controller 120 may transmit the information to the ranging unit 121.

Figure 11:
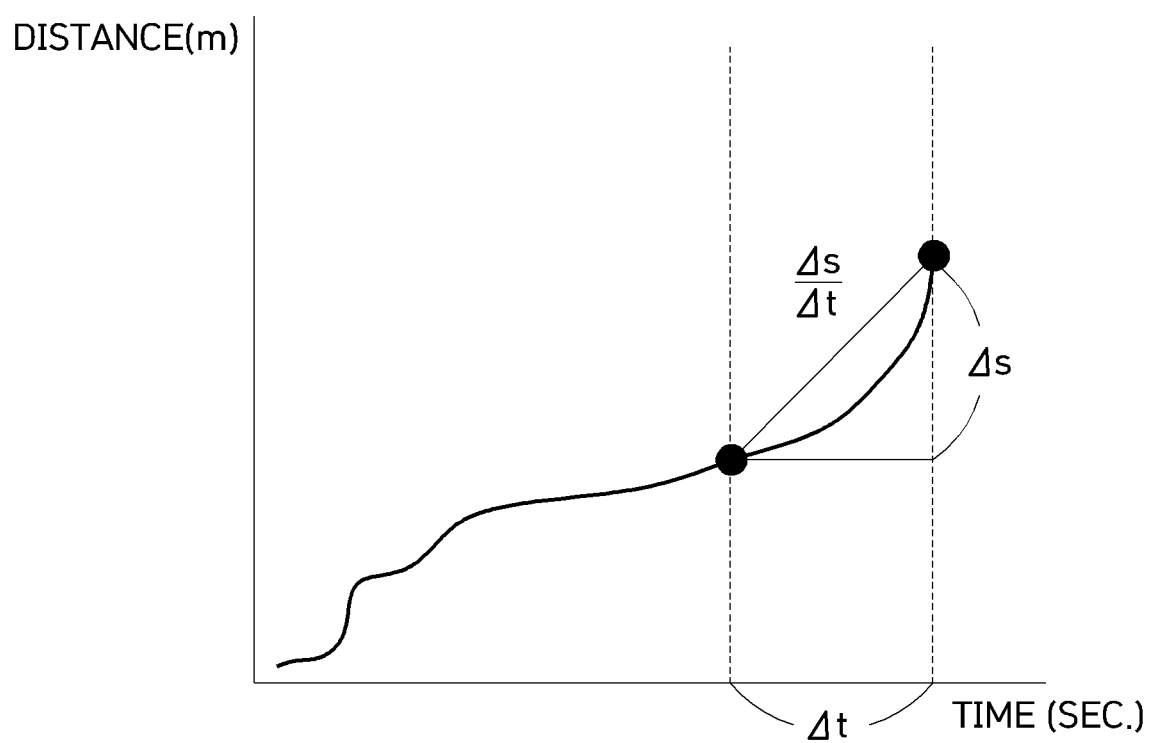
FIG. 11 is a reference view for explaining calculation of an average movement speed of a UWB tag according to still another embodiment of the present disclosure.

The ranging unit 121 may store movement path data (or time and position) of the UWB tag 200 for a predetermined time period, and use the data to calculate the average movement speed and movement direction of the UWB tag 200 for the predetermined time period. The average movement speed calculated by the ranging unit 121 refers to a speed of the UWB tag 200 at which the UWB tag 200 is moved away from a specific position of the vehicle (e.g., the center of gravity of the vehicle) for the predetermined time period (see detailed description below and FIG. 11). The ranging unit 121 may store the movement path data (time and position) of the UWB tag 200 for the predetermined time period, and thus calculate the speed and direction of the UWB tag 200. The ranging unit 121 may transmit the average movement speed, movement direction, distance from the specific position of the vehicle to the finally-measured position of the UWB tag 200 or finally-measured position of the UWB tag 200 in a recent predetermined time range to the UWB anchor 110 that reaches the maximum number of failed ranging round attempts, through the vehicle network communication unit 122.

The control unit 113 of the UWB anchor 110 may determine the UWB OFF time based on the information received through the vehicle network communication unit 114. For example, the control unit 113 may set a threshold of the average movement speed and control the UWB ON/OFF time setting to be changed based on whether the average movement speed exceeds the threshold. For example, when the average movement speed of the UWB tag 200 exceeds 0.5 m/sec, the control unit 113 may determine to minimize the power consumption by controlling the UWB OFF time of the UWB anchor 110 to be longer than the UWB ON time. On the other hand, when the average movement speed of the UWB tag 200 is 0.5 m/sec or less, the control unit 113 may determine to secure a constant ranging performance by controlling the UWB OFF time of the UWB anchor 110 to be equal to the UWB ON time. In addition, when a threshold for the distance from the specific position of the vehicle to the UWB tag 200 is specified, the control unit 113 may control the UWB OFF time to be changed based on whether the corresponding distance exceeds the threshold. For example, the threshold of the distance may be 20 m. In this case, when the distance exceeds this threshold, the control unit 113 may determine to minimize the power consumption by controlling the UWB OFF time to be longer than the UWB ON time. On the other hand, when the distance is within 20 m, the control unit 113 may determine to secure the constant ranging performance by controlling the UWB OFF time to be equal to the UWB ON time. In addition, the control unit 113 may control the UWB OFF time to be changed based on whether the finally-measured position of the UWB tag 200 is close to the UWB anchor 110. For example, the control unit 113 may determine to control the UWB OFF time to be equal to the UWB ON time when the finally-measured position of the UWB tag 200 is close to the UWB anchor 110, and to control the UWB OFF time to be longer than the UWB ON time when the finally-measured position of the UWB tag 200 is far from the UWB anchor 110. In detail, for example, the UWB anchor 110 may be installed in the front of the vehicle. In this case, the control unit 113 may control the UWB ON time to be equal to the UWB OFF time when the finally-measured position of the UWB tag 200 is in the front of the vehicle, and may control the UWB OFF time to be longer than the UWB ON time when the position of the UWB tag 200 is at the rear of the vehicle.

The description describes calculation of the average movement speed of the UWB tag 200 according to still another embodiment of the present disclosure.

The average movement speed calculated by the ranging unit 121 refers to the speed of the UWB tag 200 at which the UWB tag 200 is moved away from the specific position of the vehicle (e.g., the center of gravity of the vehicle) for the predetermined time period. For example, an initial distance from the center of gravity of the vehicle to the UWB tag 200 may be 10 m, and the distance from the center of gravity of the vehicle to the UWB tag 200 may be 15 m at timing when 10 seconds elapses therefrom. In this case, the average movement speed of the UWB tag 200 for 10 seconds may be 0.5 m/sec, which is obtained by dividing (15 m minus 10 m) by 10 seconds. In the graph shown, an X-axis indicates time, and a Y-axis indicates the distance from the specific position of the vehicle to the UWB tag 200. A predetermined time (at) before a calculation timing may be a starting point of a time interval, and the calculation timing may be an end point of the time interval. In this case, the average movement speed of the UWB tag 200 at the calculation timing, obtained by the ranging unit 121 may have a value obtained by dividing a difference (As) between the distance from the specific position of the vehicle to the UWB tag 200 at the starting point and the distance from the specific position of the vehicle to the UWB tag 200 at the end point by the predetermined time (at).

Figure 12:
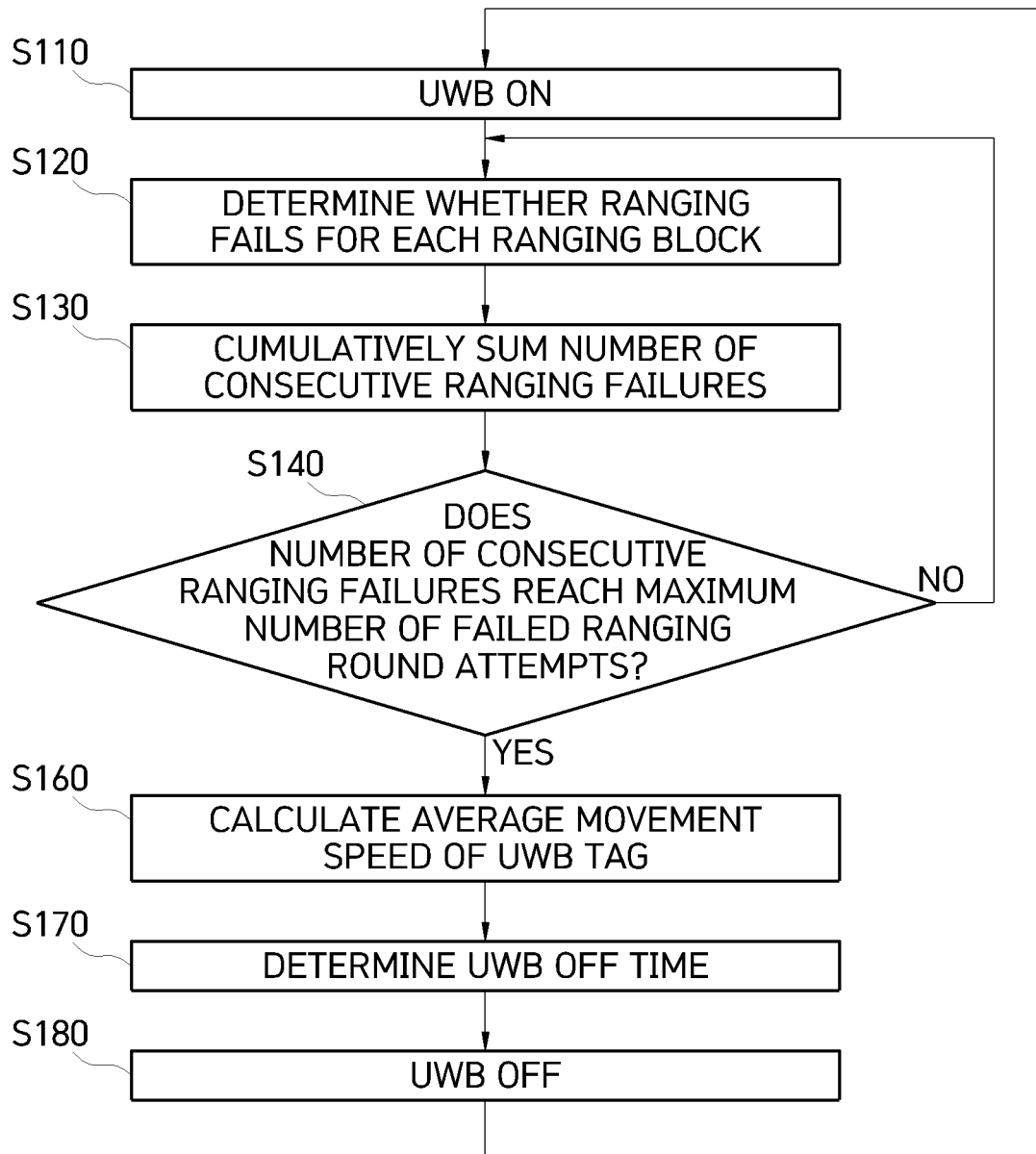
FIG. 12 is a flowchart for explaining another example of the UWB ON/OFF operation method of a UWB anchor according to another embodiment of the present disclosure.

FIG. 12 is a flowchart for explaining another example of the UWB ON/OFF operation method of a UWB anchor according to another embodiment of the present disclosure.

Descriptions of operations S110 to S130 and S180 are the same as those described with reference to FIG. 9.

In operation S140, it may be determined whether the number of consecutive ranging failures reaches the predetermined maximum number of failed ranging round attempts, the operation may return to operation S120 to determine whether the ranging consecutively fails for each ranging block when the number does not reach the maximum number of failed ranging round attempts, and operation S160 may be performed when the number reaches the maximum number of failed ranging round attempts.

In operation S160, the ranging unit 121 of the integrated controller 120 may calculate the average movement speed of the UWB tag 200 for a recent movement path thereof. In addition, the ranging unit 121 of the integrated controller 120 may determine a recent average movement direction of the UWB tag 200 based on the movement path data of the UWB tag 200. A time range for calculating the average movement speed and the average movement direction may have a predetermined specific value (e.g., 10 seconds).

In operation S170, the ranging unit 121 of the integrated controller 120 may transmit the average movement speed of the UWB tag 200 to the UWB anchor 110 whose number of consecutive ranging failures reaches the maximum number of failed ranging round attempts, through the vehicle network communication unit 122. In addition, the ranging unit 121 may transmit the average movement direction of the UWB tag 200 or the distance from the specific position of the vehicle to the finally-measured position of the UWB tag 200 instead of the average movement speed of the UWB tag 200. The control unit 113 of the UWB anchor 110 may determine the UWB OFF time based on at least one of the average movement speed, average movement direction and the finally-measured distance to the position of the UWB tag 200.

For reference, the components according to an embodiment of the present disclosure may be implemented in the form of software or hardware, such as a field programmable gate array (FPGA) or an application specific integrated circuit (ASIC), and perform specific roles.

However, the meaning of the "components" is not limited to software or hardware, and each of the components may be configured to reside in an addressable storage medium and to reproduce one or more processors.

Thus, as an example, the components include components such as software components, object-oriented software components, class components, and task components, processes, functions, attributes, procedures, sub-routines, program code segments, drivers, firmware, microcode, circuits, data, databases, data structures, tables, arrays, and variables.

Components and functions provided by the corresponding components may be combined into a smaller number of components or may be further divided into additional components.

The term " . . . unit" used in the embodiments of the present disclosure refers to a software component or a hardware component such as an FPGA or an ASIC, and performs predetermined roles. However, it is to be understood that the term " . . . unit" is not limited to a software or hardware component. The " . . . unit" may be configured to reside in an addressable storage medium or to reproduce one or more processors. Thus, as an example, " . . . unit" includes components such as software components, object-oriented software components, class components, and task components, and processes, functions, attributes, procedures, sub-routines, program code segments, drivers, firmware, microcode, circuits, data, databases, data structures, tables, arrays, and variables. The " . . . units" and functions provided by the " . . . units" may be combined into a smaller number of components and " . . . units" or may be further divided into additional components and " . . . units." In addition, the components and " . . . units" may be implemented to reproduce one or more CPUs in a device or a secure multimedia card.

Although the present disclosure has been described hereinabove with reference to the embodiments, those skilled in the art needs to understand that various modifications and alterations to the present disclosure may be made without departing from the spirit and scope of the present disclosure as defined in the following claims.

What is claimed is:

1. An ultra-wideband (UWB) anchor using a UWB ON/OFF operation method to minimize degradation of ranging performance, the UWB anchor comprising:

a power supply configured to supply power to the UWB anchor;

a transceiver configured to transmit/receive a UWB signal to and from a UWB tag for performing ranging; and a controller configured to end a ranging session when a cumulative sum of consecutive ranging failures over a specific time period reaches a maximum number of failed ranging round attempts, and to control the power supply and the transceiver to re-enter a UWB signal-reception standby (or UWB ON) mode based on the maximum number of failed ranging round attempts and a ranging block, wherein the specific time period includes a plurality of ranging rounds, wherein when the number of ranging failures reaches the maximum number of failed ranging round attempts, the UWB anchor transmits corresponding information.

2. The UWB anchor of claim 1, wherein a control condition of the controller for entry into the UWB ON mode is a UWB OFF time elapses.

3. A smart key system using a UWB ON/OFF operation method to minimize degradation of ranging performance, the smart key system comprising:

a plurality of UWB anchors installed in a vehicle, each UWB anchor being configured to calculate a distance between itself and a UWB tag through UWB communication and to transmit the distance; and an integrated controller configured to calculate position of the UWB tag by using the distances transmitted from the plurality of UWB anchors, and to store the position of the UWB tag, wherein each UWB anchor is configured to end a ranging session when a cumulative sum of consecutive ranging failures over a specific time unit reaches a maximum number of failed ranging round attempts, and to re-enter a UWB signal-reception standby (or UWB ON) mode based on the maximum number of failed ranging round attempts and a ranging block, wherein the specific time period includes a plurality of ranging rounds, wherein each UWB anchor includes:

a power supply configured to supply power to the UWB anchor, a transceiver configured to transmit/receive a UWB signal to and from the UWB tag for performing ranging, a controller configured to control the power supply and the transceiver to re-enter the UWB signal-reception standby (or the UWB ON) mode when a condition is satisfied, and a vehicle network communication unit configured to transmit corresponding information to the integrated controller when the number of ranging failures reaches the maximum number of failed ranging round attempts.

4. An ultra-wideband (UWB) ON/OFF operation method of a UWB anchor to minimize degradation of ranging performance, the UWB ON/OFF operation method comprising:

entering, by a UWB anchor, a UWB signal-reception standby (or UWB ON) mode;

determining, by a controller of the UWB anchor, whether ranging fails for each ranging block;

cumulatively summing, by the controller, a number of consecutive ranging failures for each ranging block when the ranging consecutively fails;

maintaining the UWB anchor in a UWB signal-reception non-standby (or UWB OFF) mode for a UWB OFF time when a cumulative sum of consecutive ranging failures reaches a maximum number of failed ranging round attempts; and returning the UWB anchor to the UWB signal-reception standby (or UWB ON) mode based on the maximum number of failed ranging round attempts and the ranging block, wherein each ranging block includes a plurality of ranging rounds, wherein when the number of ranging failures reaches the maximum number of failed ranging round attempts, the UWB anchor transmits corresponding information.

* * * * *